US006967822B2

(12) United States Patent
Chang et al.

(10) Patent No.: US 6,967,822 B2
(45) Date of Patent: Nov. 22, 2005

(54) DISK DRIVE ACTUATOR IMPACT REBOUND CRASH STOP WITH BIAS TAB AND PUSHER AND CRASH STOP FACES

(75) Inventors: Joseph Chang, Cupertino, CA (US); Ron Kirkish, Campbell, CA (US); Vinod Sharma, San Jose, CA (US); Frank I. Morris, San Jose, CA (US); Bipin V. Gami, San Jose, CA (US)

(73) Assignee: Samsung Electronics Co, Ltd., Suwon (KR)

( * ) Notice: Subject to any disclaimer, the term of this patent is extended or adjusted under 35 U.S.C. 154(b) by 87 days.

(21) Appl. No.: 10/117,518

(22) Filed: Apr. 4, 2002

(65) Prior Publication Data

US 2003/0189795 A1 Oct. 9, 2003

(51) Int. Cl.[7] .......................... G11B 21/22; G11B 5/54
(52) U.S. Cl. .................................. 360/265.1; 360/256.2
(58) Field of Search ............................ 360/256.2, 265.1

(56) References Cited

U.S. PATENT DOCUMENTS 6,731,468 B2 * 5/2004 Williams et al. ............ 360/256

* cited by examiner

*Primary Examiner*—Craig A. Renner
(74) *Attorney, Agent, or Firm*—Gregory Smith & Associates; Jeffrey P. Aiello; Earle Jennings

(57) ABSTRACT

The invention includes an impact rebound crash stop pivoting about a pivot between the top and bottom yoke of an actuator magnet assembly. The impact rebound crash stop includes a latch bias tab magnetically attracted to the voice coil magnet when it is near. The invention further includes a proximity latch allowing the actuator to stay on the ramp when not in use. The invention includes actuator arms embedding part of the magnetic proximity latch, actuators, and disk drives using the crash stop and proximity latch, as well as methods of making actuator arms, actuators and disk drives.

22 Claims, 7 Drawing Sheets

DISK DRIVE ACTUATOR IMPACT REBOUND CRASH STOP WITH BIAS TAB AND PUSHER AND CRASH STOP FACES

TECHNICAL FIELD

This invention relates to latch mechanisms used in parking read-write heads outside the disk media surface(s).

BACKGROUND ART

Disk drives are an important data storage technology based on several crucial components including disk media surfaces and read-write heads. When in operation, rotation of disk media surfaces, with respect to the read-write heads, causes each read-write head to float a small distance off the disk media surface it accesses. However, for a variety of reasons, disk media surfaces frequently stop rotating when not in operation for awhile.

When the disk media surface is not rotating with respect to the read-write head, mechanical vibrations acting upon the disk drive can cause the read-write head to collide with the disk media surface, unless they are separated.

This separation is often referred to as "parking" the read-write heads. Parking the read-write heads minimizes the possibility of damaging the disk media surfaces and/or the read-write heads due to these mechanical collisions. Often such parking mechanisms include a ramp on which the head slider(s) are "parked" and a latch mechanism. The purpose of the latch mechanism is to minimize the chance that the actuator will accidentally leave the parking ramp outside the disk media surface and potentially damage the disk media surface(s).

FIG. 1A illustrates a typical prior art high capacity disk drive 10 including actuator arm 30 with voice coil 32, actuator axis 40, suspension or head arms 50–58 with slider/head unit 60 placed among the disks.

FIG. 1B illustrates a typical prior art high capacity disk drive 10 with actuator 20, actuator arm 30 with voice coil 32, actuator axis 40, head arms 50–56 and slider/head units 60–66 with the disks removed.

Since the 1980's, high capacity disk drives 10 have used voice coil actuators 20–66 to position their read/write heads over specific tracks. The heads are mounted on head sliders 60–66, which float a small distance off the disk drive surface 12 when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–56 positioning head slider units 60–66 over specific tracks with remarkable speed and accuracy. Actuator arms 30 are often considered to include voice coil 32, actuator axis 40, head arms 50–56 and head sliders 60–66. Note that actuator arms 30 may have as few as a single head arm 50. Note also that a single head arm 52 may connect with two head sliders 62 and 64.

While there are many forms of mechanical impact upon a disk drive, only rotary shock in actuator 30's plane of motion can bring the read-write heads into collision with disk media surfaces once the read-write heads are parked. These rotary shocks will be described herein based upon a view defining clockwise and counterclockwise rotations with respect to the disk drive base, with a parking zone located to the right of the disk media surfaces as viewed from above the disk base. As will be apparent to one of skill in the art, it is just as possible for a disk drive to use a parking zone on the left of the disk media surfaces. While this is most certainly possible, the discussion hereafter will focus on a parking zone to the right to clarify the discussion. Such a clarification is not meant to limit the scope of the claims.

FIG. 1C illustrates a magnetic latch affixed to an actuator arm 30 of the prior art.

A magnet is affixed to the tail end of the voice coil 32 region, which when near a second magnet located in either the top yoke or bottom yolk of the fixed magnet region 20, will tend to attract actuator 30 to a parking site often inside the disk media. Magnetic latches are used with Crash Start Stop (CSS) designs.

While they have been put into production in several circumstances, they place additional requirements on the voice coil actuators. This kind of latch requires additional actuator torque to exit from the parking zone. Further, these latches require sophisticated actuator speed control. Inside disk parking zones also tend to heat the read-write heads more. The read-write heads tend to suffer more frequent mechanical collisions with the disk surface.

The outside disk surface approach to parking read-write heads parks the read-write head or heads on a ramp outside the disk surface, removing and/or minimizing the possibility for contact when the disk is not in operation. Latch mechanisms provide at least some assurance that the actuator will remain parked with head sliders on the ramp even after mechanical shocks to the disk drive.

FIGS. 2A to 2C illustrate the operation of a single lever inertial latch as found in the prior art.

FIG. 2A illustrates the prior art single level inertial latch mechanism including latch arm 100 pivoting about 102 and including latch hook 104, mechanically fitting with actuator catch mechanism 106, as well as latch stop 110, and crash stop 90, with the latch mechanism at rest.

Note that actuator 30 abuts crash stop 90 and that inertial latch arm 100 abuts latch stop 110 when the single-lever inertial latch is at rest. Slider 60 is in position on parking ramp 120.

FIG. 2B illustrates the prior art single level inertial latch during a clockwise acceleration of actuator 30.

In a clockwise acceleration, actuator 30 moves away from crash stop 90 and actuator catch mechanism 106 engages with inertial latch catch mechanism 104.

FIG. 2C illustrates the prior art single level inertial latch during a counterclockwise acceleration of the actuator.

In a counterclockwise acceleration, the latch may fail if the actuator 30 rebounds from its crash stop 90.

FIG. 3A illustrates a prior art example of a dual-lever inertial latch at rest.

When at rest, a magnet or spring, (which are not shown), biases the small latch arm 142 clockwise, holding the latch 144–152 open.

FIG. 3B illustrates a prior art example of a dual-lever inertial latch during a clockwise rotational acceleration of actuator 30.

FIG. 3C illustrates a prior art example of a dual-lever inertial latch during a counterclockwise rotational acceleration of actuator 30.

The large latch arm 140 rotates in opposite directions during the clockwise and counterclockwise motions of actuator arm 30 of FIG. 3B and 3C, respectively. Motion of large latch arm 140 in either direction causes the small arm 142 to rotate counterclockwise to the close position. This dual lever action prevents a rebound of actuator arm 30 off the crash stop 90 from escaping the latched condition.

SUMMARY OF THE INVENTION

The invention includes an impact rebound crash stop pivoting about a pivot 218 between the top and bottom yoke of an actuator magnet assembly 20. The impact rebound crash stop includes a latch bias tab 210 magnetically attracted to the voice coil 32 magnet when near. The magnet attraction rigidly moves a crash stop 216 about pivot 218. This motion engages the crash stop 216 with crash stop site 226, as well as pusher 212 with pusher site 224. Pusher site 224 and crash stop site 226 are both on the actuator 30 fantail.

The impact rebound crash stop uses an impact rebound bi-directional inertial latch and is preferably made of at least one plastic with low elastic coefficient and a magnetically attractive latch bias tab 210. The plastic is preferably essentially rigid.

The invention further includes a proximity latch for an outside disk, ramp loading disk drive allowing the actuator to stay on the ramp when not in use. The proximity latch includes two small magnets 220 bonded to the top and bottom yoke of the voice coil magnet assembly 20 and the impact rebound crash stop. The proximity latch mechanism attracts a magnetically attractive component molded into the actuator fantail. The attraction is toward the crash stop. The two magnets and magnetically attractive component attract each other, but do not make contact.

The proximity latch, together with the impact rebound crash stop, provide an outside disk ramp loading disk drive with a very reliable, non-contact break free latch while maintaining a high resistance to accidental latch release during rotary shock conditions. The proximity latch mechanism achieves this without using any inertial latch mechanism, eliminating the extra travel allowance required by an impact rebound inertial latch mechanism.

The invention includes the actuator arm 30 embedding the magnetically attractive component 222 in the actuator fantail. The invention further includes an actuator 20-66 containing the proximity latch mechanism with the magnetically attractive component 222 and pusher stop 224 in the actuator fantail and crash stop 210-218 mounted through its pivot 218 to the top yoke 224 and bottom yoke 222 of the actuator magnet assembly 20.

The invention includes the making of these actuators with their crash stop and proximity latch mechanisms, as well as the making of disk drives using these actuators, and the disk drives themselves.

The invention includes the method of parking an actuator through the operation of an internal crash stop and the operation of the internal proximity latch. The invention also includes the method of parking a disk drive using the method of parking the actuator.

These and other advantages of the present invention will become apparent upon reading the following detailed descriptions and studying the various figures of the drawings.

DETAILED DESCRIPTION OF THE INVENTION

A proximity latch for an outside disk ramp loading disk drives allows the actuator to stay on the ramp when not in use (see FIGS. 5A to 6B).

Figure 1A:
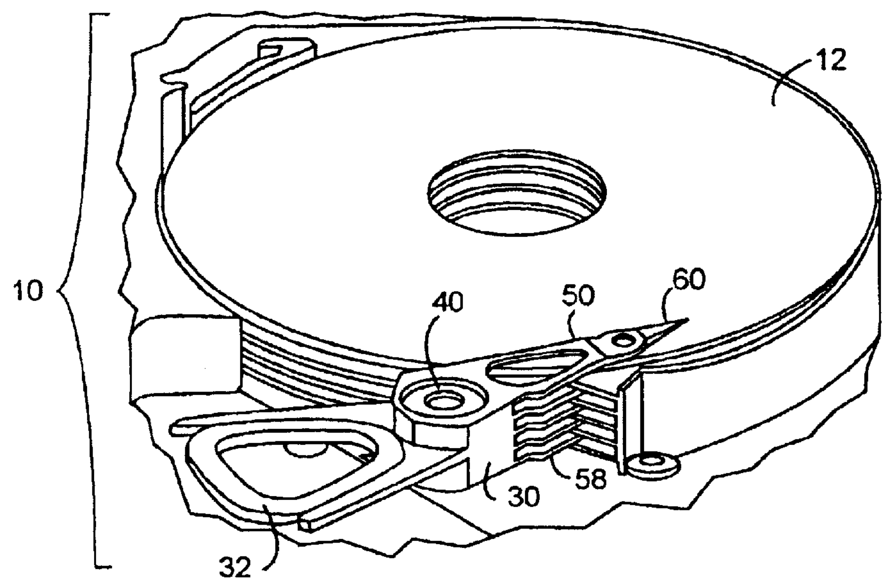
FIG. 1A illustrates a typical prior art high capacity disk drive 10 including actuator arm 30 with voice coil 32, actuator axis 40, suspension or head arms 50–58 with slider/head unit 60 placed among the disks.
Figure 1B:
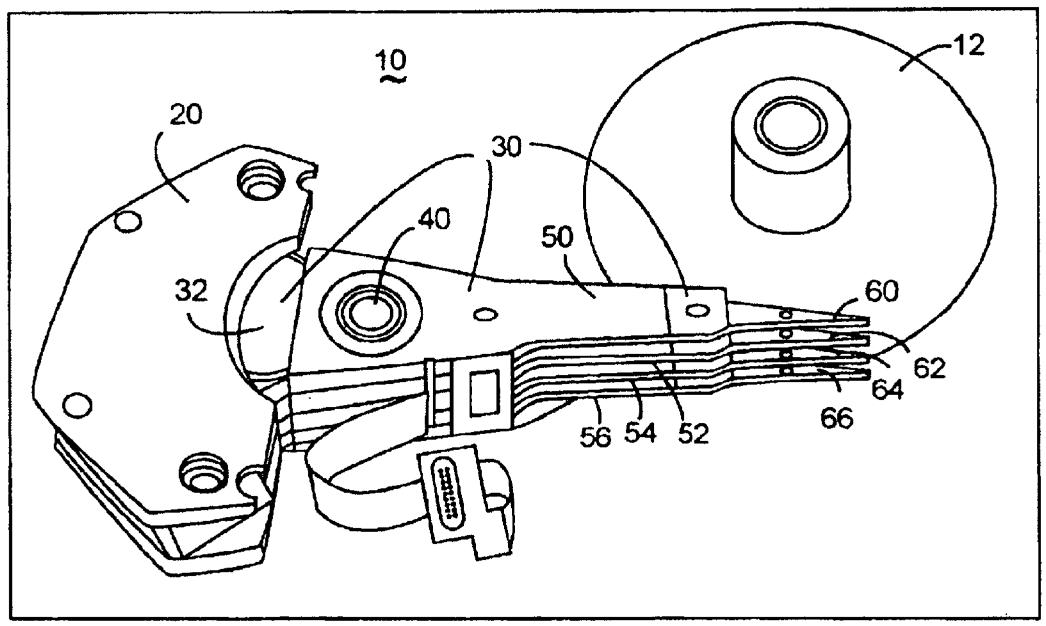
FIG. 1B illustrates a typical prior art high capacity disk drive 10 with actuator 20, actuator arm 30 with voice coil 32, actuator axis 40, head arms 50–56 and slider/head units 60–66 with the disks removed.
Figure 1C:
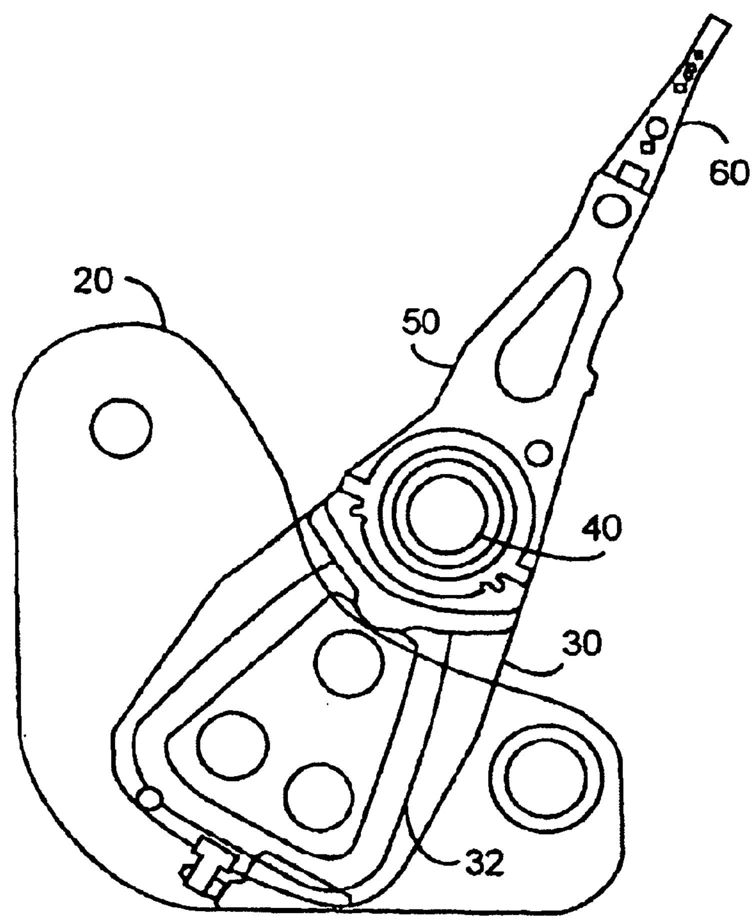
FIG. 1C illustrates a magnetic latch affixed to an actuator arm 30 of the prior art.
Figure 2A:
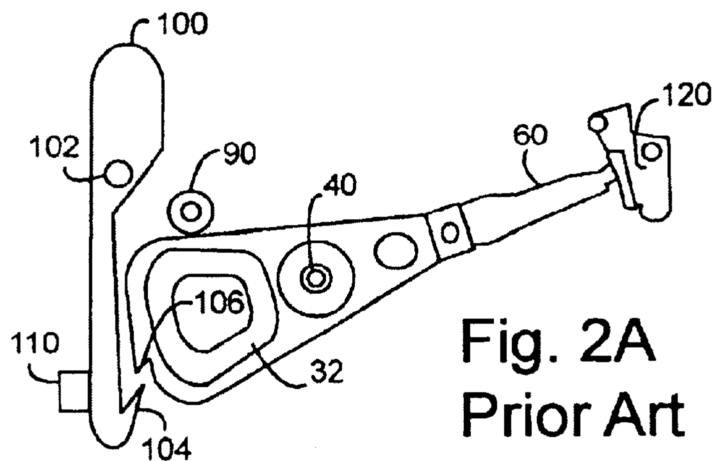
FIG. 2A illustrates the prior art single level inertial latch mechanism including latch arm 100 pivoting about 102 and including latch hook 104, mechanically fitting with actuator catch mechanism 106, as well as latch stop 110, and crash stop 90, with the latch mechanism at rest.
Figure 2B:
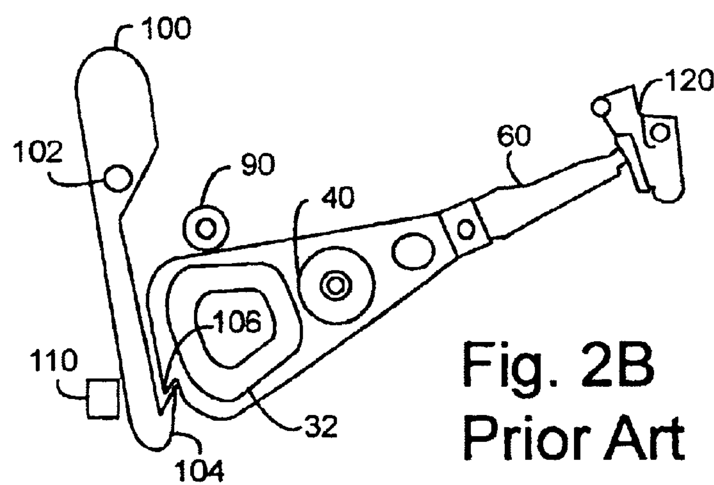
FIG. 2B illustrates the prior art single level inertial latch during a clockwise acceleration of actuator 30.
Figure 2C:
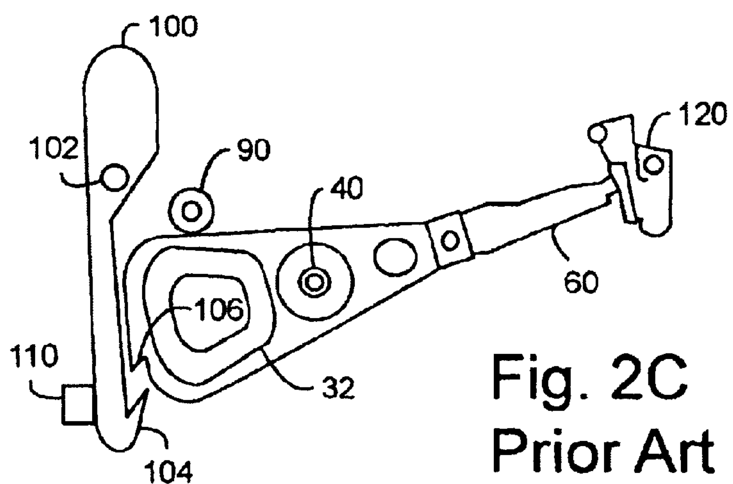
FIG. 2C illustrates the prior art single level inertial latch during a counterclockwise acceleration of the actuator.
Figure 3A:
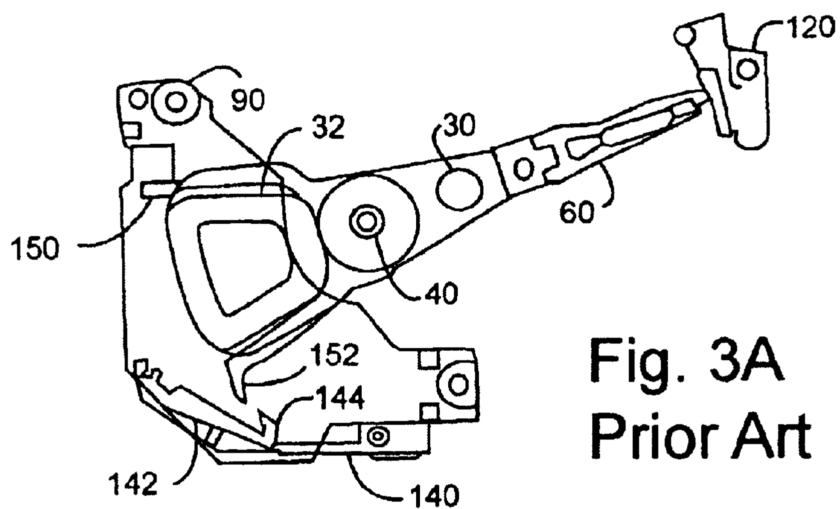
FIG. 3A illustrates a prior art example of a dual-lever inertial latch at rest.
Figure 3B:
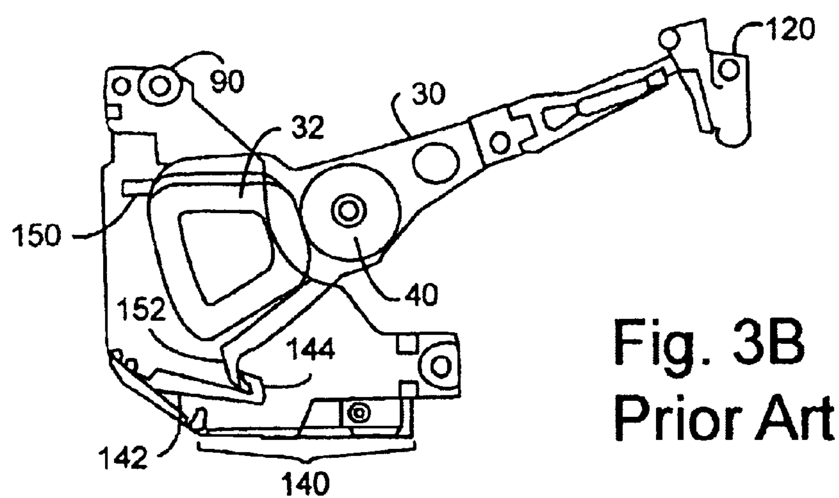
FIG. 3B illustrates a prior art example of a dual-lever inertial latch during a clockwise rotational acceleration of actuator 30.
Figure 3C:
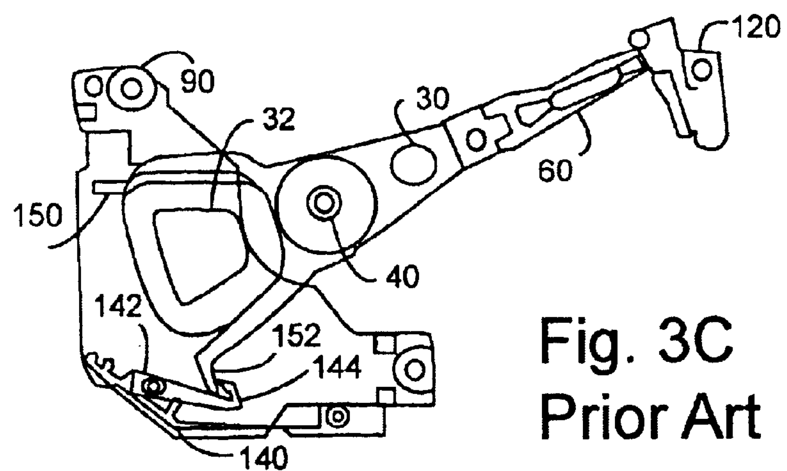
FIG. 3C illustrates a prior art example of a dual-lever inertial latch during a counterclockwise rotational acceleration of actuator 30.
Figure 4:
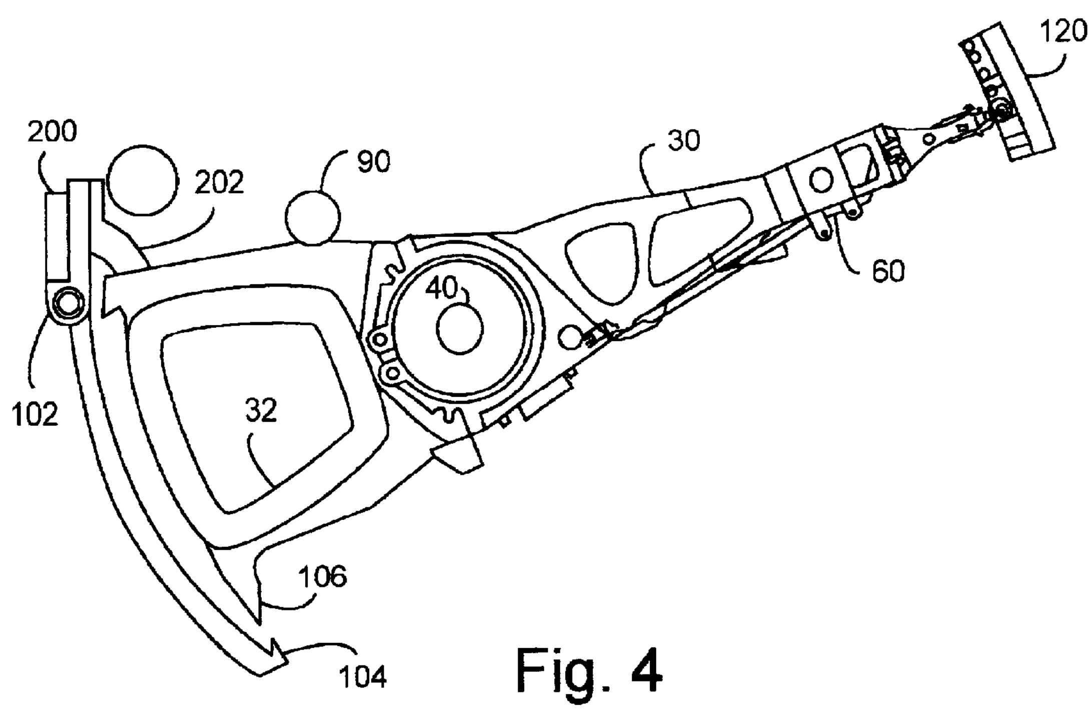
FIG. 4 illustrates an impact rebound type bi-directional inertial latch.

FIG. 4 illustrates an impact rebound type bi-directional inertial latch.

The inertial latch rests in an open position due to a light bias torque applied by the magnetic attraction between the voice coil 32 magnet and the balance steel 200 when there is no externally induced rotational acceleration acting upon actuator arm 30.

Actuator arm 30 and the latch assembly 102-104-202 are rotationally balanced. During clockwise rotational acceleration of the disk drive, the latch 102-104 rotates in the counterclockwise direction with respect to the base. This latch motion causes the latch hook 104 to engage the barb 106 on the actuator 30 tail.

During counterclockwise rotational acceleration of the disk drive, actuator arm 30 rebounds from its crash stop 90 and the latch 202-102-104 also rebounds in the clockwise direction with respect to the base, due to the actuator tail touching the rebound part 202 of the latch. This latch motion causes the latch hook 104 to engage the barb 104 on the actuator 30 tail.

Figure 5A:
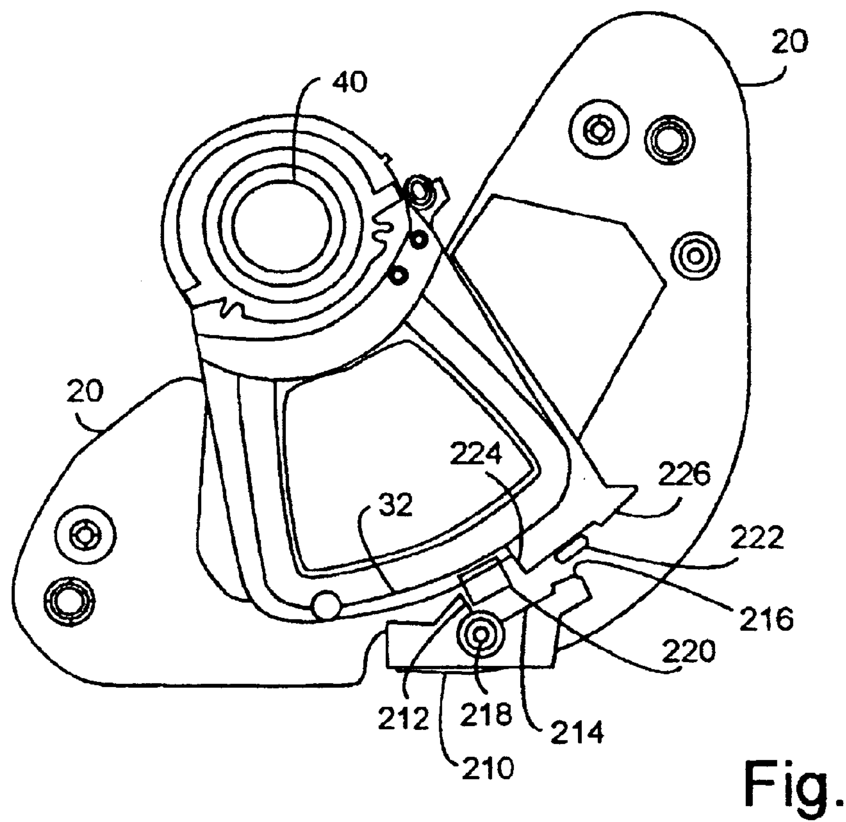
FIG. 5A illustrates the proximity latch mechanism in the open position.

FIG. 5A illustrates the proximity latch mechanism in the open position.

Figure 5B:
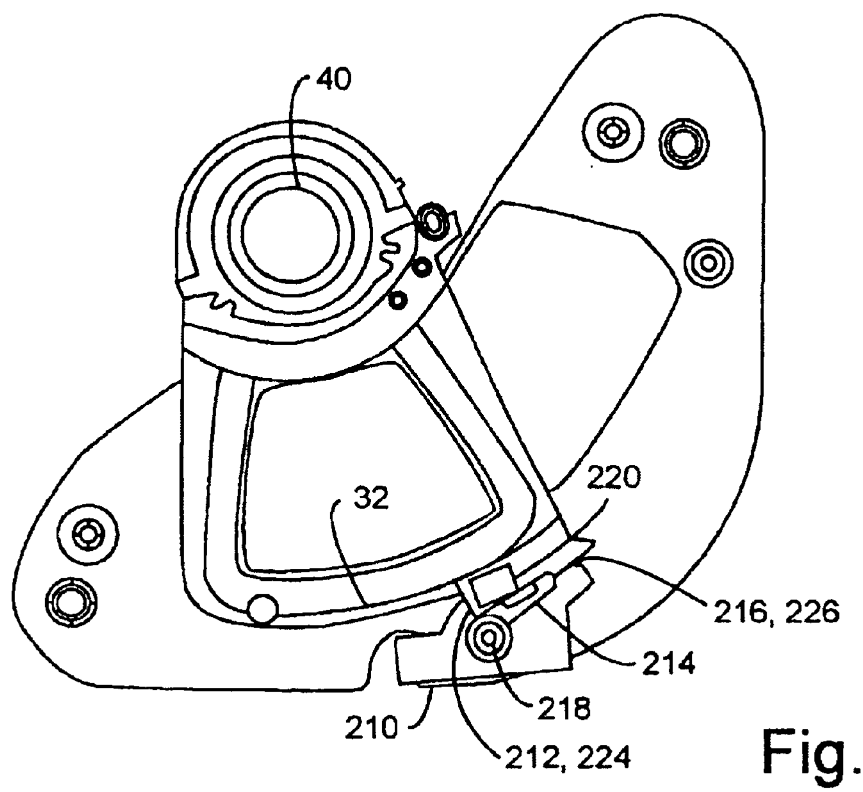
FIG. 5B illustrates the proximity latch mechanism in the closed position.

FIG. 5B illustrates the proximity latch mechanism in the closed position.

Figure 6A:
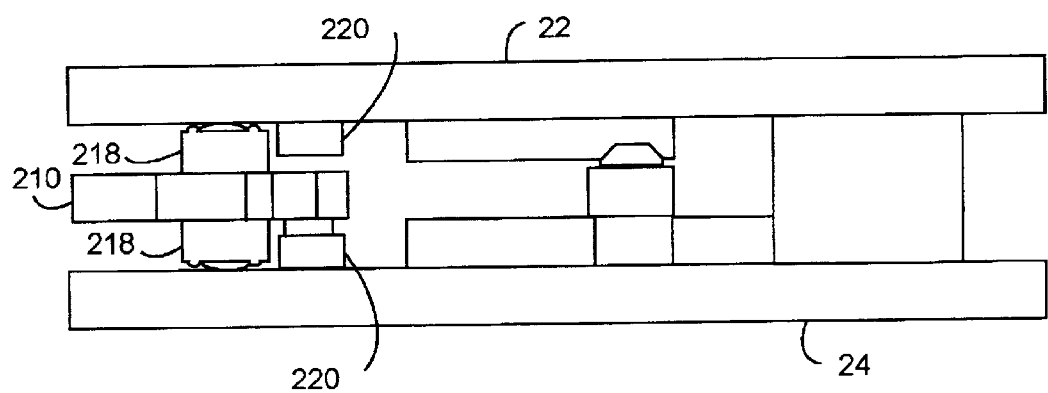
FIG. 6A illustrates a side view of the proximity latch mechanism as housed in the voice coil magnet assembly.

FIG. 6A illustrates a side view of the proximity latch mechanism as housed in the voice coil magnet assembly.

Figure 6B:
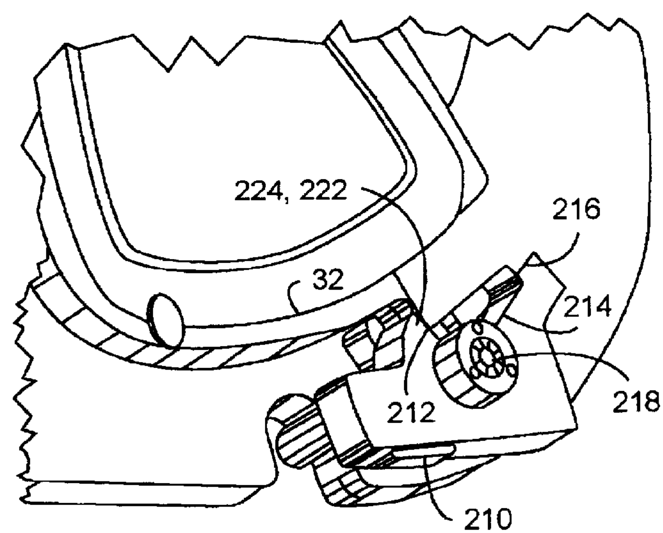
FIG. 6B illustrates a perspective view of the proximity latch mechanism.

FIG. 6B illustrates a perspective view of the proximity latch mechanism.

The proximity latch includes two small magnets 220 bonded to the top yoke 22 and bottom yoke 24 of the actuator assembly 20 and an impact rebound crash stop 216. The impact rebound crash stop 216 uses an impact rebound bi-directional inertial latch 210-218. The impact rebound bi-directional latch includes pusher 212, latch pivot 218 and latch bias tab 210.

The proximity latch mechanism attracts a magnetically attractive component 222 molded into the actuator fantail toward the two small magnets 220. The actuator fantail is further formed of a pusher stop 224 and a crash stop site 226. The attraction is toward the pusher 212. Note that the small magnets 220 are preferably magnetically aligned so that their North poles point in essentially the same direction.

The two small magnets 220 and magnetically attractive component 222 attract each other, but do not make contact. However, as the two small magnets 220 and the magnetically attractive component 222 approach each other, pusher stop 224 engages pusher 210, rotating the proximity latch mechanism 210-218 about latch pivot 218 to engage crash stop 216 and crash stop site 226.

The magnetically attractive component 222 is preferably made of a magnetically attractive form of steel, preferably number 430.

Note that the proximity latch mechanism illustrated in FIGS. 5A and 5B does not use an impact rebound inertial latching mechanism. This eliminates the extra travel allowance required in all the designs illustrated by FIGS. 1C to 4.

The impact rebound crash stop 216 halts the actuator 30 at a contact point illustrated in FIG. 5B through engagement with crash stop site 226 on actuator arm 30.

The magnetic force between the magnetically attractive actuator component 222 and the two non-contact magnets 220, provide a torque upon the actuator. This magnetic force is preferably between 4.8 and 6.0 Newton-meter^2. This preferred magnetic force supports high rotary shock performance in the clockwise direction. The impact rebound crash stop 216 is used to keep the actuator 30 from rebounding during counterclockwise rotary shocks. The impact rebound crash stop 216 is built into the voice coil magnet assembly as shown in FIG. 6B.

When the actuator approaches the impact rebound crash stop, the magnetic latching mechanism engages and helps the actuator to move faster into the crash stop. The magnetic latching mechanism includes the magnetic attraction between the two small magnets and magnetically attractive component molded into the actuator. The two small magnets are placed on the top and bottom yokes of the voice coil magnet assembly exactly so that the actuator is maintained at a parking "home" where the impact rebound crash stop is located. As the magnetically attractive component of the actuator slowly approaches the flux generated by these two small magnets, the actuator pushes upon the impact rebound crash stop. The impact rebound crash stop is rotated clockwise until the impact rebound crash stop touches the actuator by its latch arm at the crash stop.

The proximity latch mechanism helps a disk drive resist relatively high rotary shock in the clockwise direction with respect to the disk drive base. This resistance depends upon the magnetic attractive force between the two small magnets and the magnetically attractive component molded into the actuator.

The impact rebound crash stop helps increase rotary shock performance in the counterclockwise direction with respect to the disk drive base. The impact response crash stop is preferably made from plastic, preferably from an ultem plastic material. The actuator fan tail is preferably includes a plastic overmold made of vectra.

The elastic coefficient between the plastic impact response crash stop and the plastic overmold actuator fantail is less than one, preferably about 0.6. The elastic coefficient being less than one contributes to very minimal rebound effect from impact between the actuator fantail and the impact rebound crash stop. The loss of high energy during the impact also significantly reduces the chance of sudden impact rebound motion. This reduction in the chance of sudden impact rebound motion, combined with the reduced energy of any sudden impact rebound motion, both contribute to high rotary shock resistance in the counterclockwise direction with respect to the disk drive base.

The latch bias tab 210 is molded into the latch mechanism and supports the latch opening its arm automatically when the actuator is controlled to move out in a desirable speed. The latch opens its arm based upon the attractive force generated on the latch bias tab 210 by the voice coil magnet 32. The latch bias tab 210 is preferably composed of a magnetically attractive steel compound preferably SUS 430 steel.

The invention secures read-write head parking through rotational shocks of 25,000 to 30,000 radians/sec^2 of up to two milliseconds duration. Note that the contemporary industry standard is support for up to 20,000 radians/sec^2.

Depending upon the small magnets, the performance can protect read-write head parking under even more severe conditions. The small magnets preferably have magnetic strengths of 48 MGO and are preferably 1.5 millimeters thick and 3 millimeters by 4 millimeters wide.

The preceding embodiments have been provided by way of example and are not meant to constrain the scope of the following claims.

What is claimed is:

1. An impact rebound crash stop for an actuator, wherein said actuator includes an actuator magnet assembly with yoke collection comprising a top yoke and a bottom yoke, and includes a voice coil magnet in an actuator arm, wherein said impact rebound crash stop is comprised of:

a rigid plastic body containing a pivot between said top yoke and said bottom yoke coupling said impact rebound crash stop to said actuator magnet assembly;

a latch bias tab rigidly affixed to said rigid plastic body and magnetically attracted to said voice coil magnet when said actuator arm is near said crash stop;

wherein said rigid plastic body is comprised of a pusher face and a crash stop face;

wherein said actuator arm includes an actuator tail comprising a pusher stop face and a crash stop site;

wherein whenever said actuator arm is near said crash stop, said crash stop pivots bringing said pusher face into a rotational path of said pusher stop face leading to said pusher face engaging said pusher stop face;

wherein whenever said pusher face engages said pusher stop face, said crash stop pivots, engaging said crash stop face and said crash stop site; and wherein whenever said crash stop face engages said crash stop site and a first voltage is applied to said voice coil magnet, said voice coil magnet magnetically acts against said actuator magnet assembly repelling said crash stop site from said crash stop face.

2. The impact rebound crash stow of claim 1, wherein said rigid plastic body has an elastic coefficient of less than one with respect to contact with said actuator arm.

3. The impact rebound crash stop of claim 2, wherein said elastic coefficient is less than 0.75.

4. The impact rebound crash std of claim 1, wherein said actuator tail further comprises an overmold containing said pusher stop face and said crash stop site; and wherein said overmold is rigidly attached to said actuator arm.

5. The actuator of claim 1, further comprising:

a proximity latch including:

at least one small magnet affixed to a member of one of said yokes, and a magnetically attractive component in said actuator tail;

wherein whenever said actuator tail is near said small magnet, said magnetically attractive component and said small magnet attract each other, moving said actuator tail near said impact rebound crash stop.

6. The actuator of claim 5, wherein said proximity latch further includes two of said small magnets, each small magnet affixed to distinct members of said yoke collection; and wherein both of said small magnets are affixed to said yoke collection members so that said small magnets essentially share the same North pole;

wherein whenever said actuator tail is near said two small magnets, said magnetically attractive component and said small magnets attract each other, moving said actuator tail near said impact rebound crash stop.

7. The actuator of claim 1, wherein said actuator tail further comprises an overmold containing said pusher stop face, said crash stop site, and said magnetically attractive component; and wherein said overmold is rigidly attached to said actuator arm.

8. An actuator comprised of said impact rebound crash stop of claim 1, said actuator magnet assembly with said yoke collection of claim 1, and said voice coil magnet in said actuator arm of claim 1.

9. A disk drive comprised of said actuator of claim 8.

10. An actuator for a disk drive, comprising:

a proximity latch;

an impact rebound crash stop;

an actuator magnet assembly with yoke collection comprising a top yoke and a bottom yoke; and a voice coil magnet in an actuator arm;

wherein said impact rebound crash stop is comprised of:

a rigid plastic body containing a pivot between said top yoke and said bottom yoke coupling said impact rebound crash stop to said actuator magnet assembly;

a latch bias tab rigidly affixed to said rigid plastic body and magnetically attracted to said voice coil magnet when said actuator arm is near said crash stop;

wherein said rigid plastic body is comprised of a pusher face and a crash stop face;

wherein said actuator arm includes an actuator tail comprising a pusher stop face and a crash stop site;

wherein whenever said actuator arm is near said crash stop, said crash stop pivots, bringing said pusher face into a rotational path of said pusher stop face, leading to said pusher face engaging said pusher stop face;

wherein whenever said pusher face engages said pusher stop face, said crash stop pivots, engaging said crash stop face and said crash stop site; and wherein whenever said crash stop face engages said crash stop site and a first voltage is applied to said voice coil magnet, said voice coil magnet magnetically acts against said actuator magnet assembly repelling said crash stop site from said crash stop face;

wherein said proximity latch is comprised of:

a magnetically attractive component in said actuator tail; and two small magnets, each small magnet affixed to distinct members of said yoke collection; and wherein both of said small magnets are affixed to said yoke collection members so that said small magnets essentially share the same North pole;

wherein whenever said actuator tail is near said two small magnets, said magnetically attractive component and said small magnets attract each other, moving said actuator tail near said impact rebound crash stop;

wherein said actuator tail further comprises an overmold containing said pusher stop face, said crash stop site, and said magnetically attractive component; and wherein said overmold is rigidly attached to said actuator arm.

11. The actuator of claim 10, wherein said rigid plastic body has an elastic coefficient of less than one with respect to contact with said actuator arm.

12. The actuator of claim 11, wherein said elastic coefficient is less than 0.75.

13. A disk drive comprised of said actuator of claim 10.

14. An actuator, including:

an actuator magnet assembly with a yoke collection comprising a top yoke and a bottom yoke, and an actuator arm further including a voice coil magnet and an actuator tail comprising a pusher stop face and a crash stop site;

an impact rebound crash stop is comprised of: a rigid plastic body containing a pivot, a latch bias tab, a pusher face, and a crash stop face;

wherein said actuator is a product of a manufacturing method comprising the steps of:

attaching said rigid plastic body by said pivot between said top yoke and said bottom yoke coupling said impact rebound crash stop to said actuator magnet assembly; and attaching said actuator arm between said yoke collection to enable said actuator arm to move between said yokes near said crash stop;

wherein whenever said actuator arm is near said crash stop, said crash stop pivots bringing said pusher face into a rotational path of said pusher stop face leading to said pusher face engaging said pusher stop face;

wherein whenever said pusher face engages said pusher stop face, said crash stop pivots engaging said crash stop face and said crash stop site; and wherein whenever said crash stop face engages said crash stop site and a first voltage is applied to said voice coil magnet, said voice coil magnet magnetically acts against said actuator magnet assembly repelling said crash stop site from said crash stop face.

15. A disk drive as a product of the manufacturing method of claim 14 further comprising:

using said actuator to make said disk drive.

16. The actuator of claim 14, wherein said manufacturing method further comprising the step of:

rigidly attaching an overmold to said actuator tail to create said actuator arm;

wherein said overmold contains said pusher stop face and said crash stop site.

17. The actuator of claim 14, wherein said method further comprises the step of:

creating a proximity latch including at least one small magnet affixed to a member of said yoke collection and a magnetically attractive component in said actuator tail;

wherein whenever said actuator tail is near said small magnet, said magnetically attractive component and said small magnet attract each other, moving said actuator tail near said impact rebound crash stop;

wherein the step of creating said proximity latch is further comprised of the steps of:

affixing said small magnet to said yoke collection member; and using said actuator tail in said actuator arm.

18. The actuator of claim 17, wherein said proximity latch further includes two of said small magnets;

wherein the step of affixing said magnet is further comprised of:

affixing each of said small magnets to distinct members of said yoke collection; and wherein both of said small magnets are affixed to said yoke collection members so that said small magnets essentially share the same North pole;

wherein whenever said actuator tail is near said two small magnets, said magnetically attractive component and said small magnets attract each other, moving said actuator tail near said impact rebound crash stop.

19. The actuator of claim 17, wherein said actuator tail further comprises an overmold containing said pusher stop face, said crash stop site, and said magnetically attractive component; and wherein the step of using said actuator tail is further comprised of the step of:

using said overmold rigidly attached to said actuator arm.

20. An actuator, including:

an actuator magnet assembly with a yoke collection comprising a top yoke and a bottom yoke and an actuator arm further including a voice coil magnet and an actuator tail comprising a pusher stop face and a crash stop site;

an impact rebound crash stop is comprised of: a rigid plastic body containing a pivot, a latch bias tab, a pusher face, and a crash stop face;

wherein said actuator is a product of a manufacturing method comprising the steps of:

attaching said rigid plastic body by said pivot between said top yoke and said bottom yoke coupling said impact rebound crash stop to said actuator magnet assembly; and attaching said actuator arm between said yoke collection to enable said actuator arm to move between said yokes near said crash stop;

creating a proximity latch including two small magnets affixed to distinct members of said yoke collection and a magnetically attractive component in said actuator tail;

wherein whenever said actuator arm is near said crash stop, said crash stop pivots bringing said pusher face into a rotational path of said pusher stop face leading to said pusher face engaging said pusher stop face;

wherein whenever said pusher face engages said pusher stop face, said crash stop pivots engaging said crash stop face and said crash stop site;

wherein whenever said crash stop face engages said crash stop site and a first voltage is applied to said voice coil magnet, said voice coil magnet magnetically acts against said actuator magnet assembly repelling said crash stop site from said crash stop face;

wherein whenever said actuator tail is near said small magnets, said magnetically attractive component and said small magnets attract each other, moving said actuator tail fantail near said impact rebound crash stop;

wherein the step of creating said proximity latch is further comprised of the steps of:

affixing each of said small magnets to distinct members of said yoke collection; and using said actuator tail in said actuator arm;

wherein both of said small magnets are affixed to said yoke collection members so that said small magnets essentially share the same North pole; and wherein whenever said actuator tail is near said two small magnets, said magnetically attractive component and said small magnets attract each other, moving said actuator tail near said impact rebound crash stop.

21. A disk drive as a product of the manufacturing method of claim 20 further comprising:

using said actuator to make said disk drive.

22. The actuator of claim 20, wherein said actuator tail further comprises an overmold containing said pusher stop face, said crash stop site, and said magnetically attractive component; and wherein the step of using said actuator tail is further comprised of the step of:

using said overmold rigidly attached to said actuator arm.

* * * * *